UNITED STATES PATENT OFFICE.

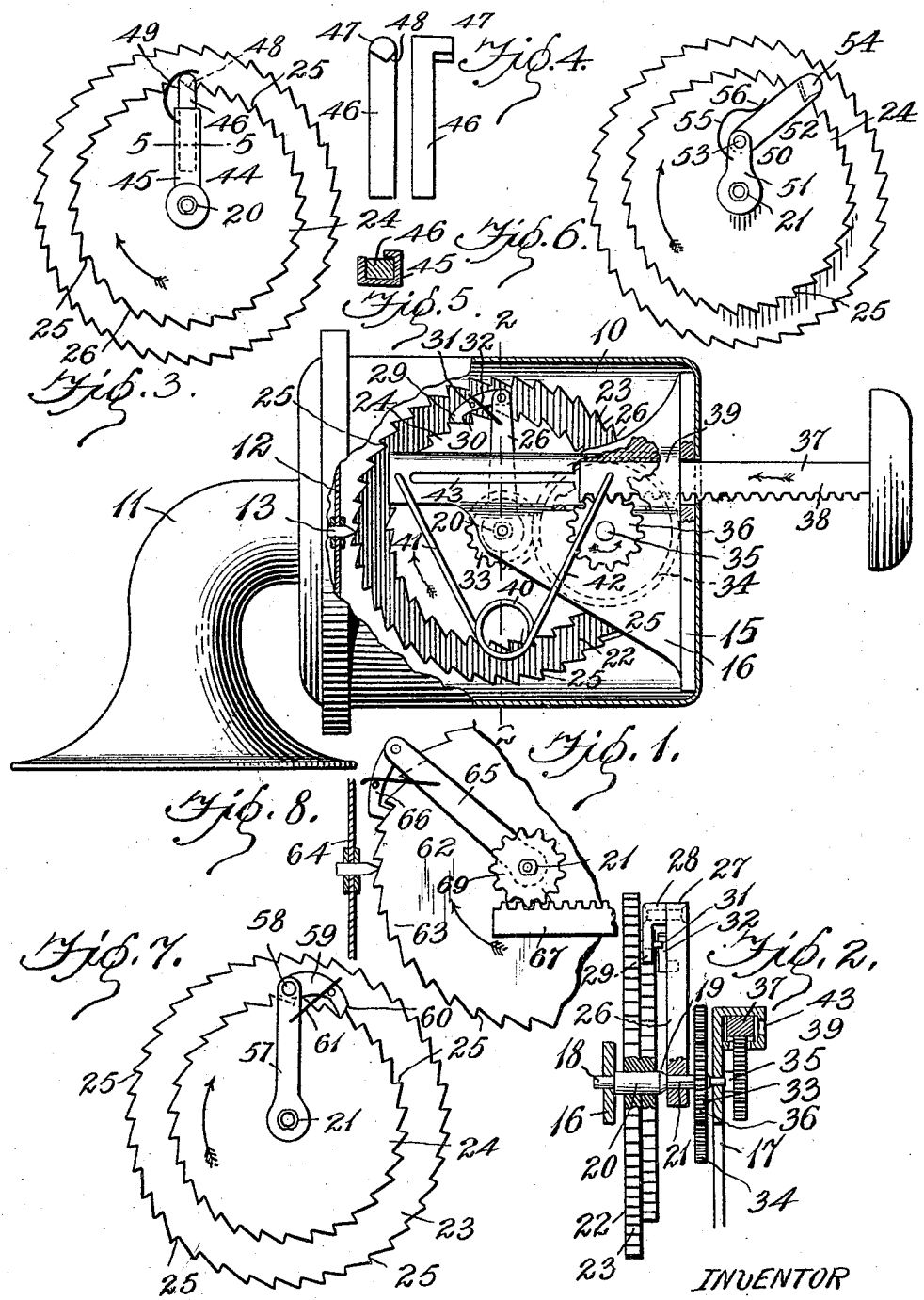

GERARD R. MARSICO, OF BROOKLYN, NEW YORK, ASSIGNOR TO PURITON MANUFACTURING CORPORATION, OF BROOKLYN, NEW YORK, A CORPORATION OF NEW YORK.

SIGNAL.

1,416,224.  Specification of Letters Patent.  Patented May 16, 1922.

Application filed June 9, 1919, Serial No. 302,743. Renewed August 27, 1921. Serial No. 496,165.

*To all whom it may concern:*

Be it known that I, GERARD R. MARSICO, citizen of the United States, and resident of Brooklyn, in the county of Kings and State of New York, have invented certain new and useful Signals, of which the following is a specification.

This invention relates to signals and particularly to an improvement of my invention shown and described in my co-pending application 302,741 executed by me of even date herewith, and wherein use is made of a heavy rotor having an annular clutch surface at its periphery and a co-acting clutch device exteriorly located with respect to said clutch surface for moving the rotor with great leverage action and force against the diaphragm or vibratory member of the signal.

In the companion case above identified, the clutch surface of the rotor is concentric with the clutch surface of the mating clutch device and the respective surfaces are movable with respect to each other to effect operative and inoperative positions of one of said surfaces to the other and for substantially spacing said surface apart when the rotor is free. To this extent I eliminate friction and at the same time apply great power to the diaphragm or vibratory member to set up a large number of disturbances therein.

In the form of invention which I will presently describe in proper detail I employ a rotor adapted to coact with the diaphragm and provided with a toothed surface at its periphery, said teeth having faces extending on substantially radial lines to the axis of the rotor and a hanger supported from the axis of the rotor and provided with a clutch device adapted to engage with said teeth to impart positive motion to the rotor when power is supplied to the hanger, the clutch device having a gripping face adapted to uniformly mate with the corresponding radial faces of said teeth so as to give firmness of contact between the rotor and the clutch device and effectuate prompt engagement between the parts when motion is applied to the said hanger.

I have also shown an arrangement whereby the diaphragm striking surface of the rotor acts in the dual capacity of a striking surface and clutch surface, the hanger in this instance having a clutch device adapted to co-act therewith so as to transfer motion to the rotor when driving force is transferred to the hanger.

The various important features will be particularly pointed out in connection with a detailed description of several embodiments of my invention which I have selected for illustration in the accompanying drawing, in which similar reference characters indicate corresponding parts in the several views.

In the drawings,

Figure 1 is a side view of the signal showing parts in section.

Figure 2 is a section on the line 2—2 of Figure 1 with parts in full lines and the case eliminated.

Figure 3 is a side view of the rotor showing a slightly modified form of the invention.

Figure 4 are respectively sides and end views of the clutch device.

Figure 5 is a section taken on the line 5—5 of Figure 3.

Figure 6 is side view of another form of rotor and clutch device.

Figure 7 is a similar view of a further modified form of clutch device and rotor and, Figure 8 is a similar view of a still further form of rotor and clutch device.

10 indicates a case having a resonator 11 and a vibratory member or diaphragm 12 the latter provided with an anvil or wear piece 13.

A bracket 15 supported within the case 10 is provided with side extensions 16 and 17 in which an axle 18 is fixedly mounted and arranged to carry a supporting sleeve 19. Said sleeve has a cylindrical extension 20 and a squared extension 21, the former receiving a free rotor 22 having a striking surface 23 adapted to co-act the anvil 13 to vibrate the diaphragm. At one side of the rotor and formed as a fixed part thereof is an annular or peripheral clutch surface 24 which is located at a point remote from the sleeve 20 for a purpose to be hereinafter explained. This clutch surface consists of identical teeth having faces 25 extending in radial lines from the axis of the rotor.

On the squared extension 21 is a fixed hanger 26 which is arranged directly at the side of the rotor adjacent to the clutch surface 24, the end 27 of which is positioned beyond said surface and it supports a pivoted clutch device 28 having a lug 29 whose face 30 is relatively broad and adapted to engage with the corresponding radial faces 25. On the dog is a pin 31 against which the free end of a light spring 32 rests so as to hold said device normally in yielding confinement with said clutch surface of the rotor.

Fixed to the squared portion 21 of the support 20 is a pinion 33 which meshes with a large gear wheel 34 on a driven shaft 35, the latter supported from the extensions 16 and 17 and as illustrated said shaft carries a pinion 36 which engages with a plunger 37 having rack teeth 38. The plunger slides in a guide 39 formed preferably by folding or bending one end of the extension 17 as clearly shown in Figure 2. A spring 40 has a branch 41 secured to the guide and the opposite end 42 of said spring is connected to the plunger 37 so as to normally hold the same extended to a starting position from the case 10 through which it slides. The spring serves to limit the outward sliding movement of the plunger to prevent its casual displacement from the pinion 36. The end 42 of the spring has its movements accommodated by providing one wall of the guide 39 with a longitudinal slot 43.

When the plunger is moved in the direction of the arrow shown in Figure 1 the gear train previously described is actuated so as to advance the striking surface of the rotor against the anvil of the diaphragm. In establishing such motion the broad flat face of the clutch device 28 is brought against the corresponding face 25 of the next adjacent tooth of the clutch surface 24. This gives positive motion to the hanger 26 but when the plunger returns to its normal position the hanger assumes its idle condition and the rotor is permitted to spend its remaining force against the diaphragm, the clutch device 28 remaining in light engagement with the clutch surface 24.

In the form shown in Figures 3, 4 and 5 the hanger 44 is provided with a tubular section 45 fixed to the sleeve 20 and a sliding section 46 accommodated by said tubular section and constituting the clutch device. Said section 46 is provided with a tooth 47 having a broad flat face 48 adapted to correspond with the mating faces 25 of the clutch surface 24. This clutch surface is formed as an integral part of the heavy rotor. A light leaf spring 49 carried by the section 45 serves to hold the tooth 47 in yielding confinement with said clutch surface.

In the form shown in Figure 6 the hanger 50 consists of a fixed section 51 carried by the section 21 of the sleeve 20 and a swinging section 52 pivoted at 53 to said fixed section and carrying a tooth 54 adapted to coact with the teeth of the clutch surface 24, the section 51 having a light spring 55 whose free end 56 rests lightly against the said clutch surface.

In the form shown in Figure 7 the hanger 57 consists of a long arm fixed to the extension 21 and provided with a pivot pin 58 at its outer end which supports a clutch device 59. This device has a face 60 adapted to co-act with the faces 25 of the clutch surface 24. A light leaf spring 61 holds the clutch device in operative confinement with said clutch surface. The difference in this form over the preferred embodiment of the invention consists in extending the movable clutch device in an opposite direction to that shown in the preferred embodiment so that in the rotation of the hanger when power is applied thereto the clutch device will operate to push against the clutch surface 24, whereas in said embodiment the clutch device pulls against the mating clutch surface of the rotor.

In the modified form shown in Figure 8 the rotor 62 has a striking surface 63 which operates against the diaphragm 64 and in this instance the hanger 65 which is carried by the extension 21 is provided with a clutch device 66 which co-acts with the teeth of the striking surface. The clutch device may, for all practical purposes, follow the design of any one of the several devices herein shown and described. However I do not wish to limit myself in that the important feature lies in the dual capacity of the surface 63 as an element of a clutch and also as a striker to operate against the anvil.

In the form shown in all of the figures except Figure 7 the respective gear ratios revolve the rotor about three times to one revolution of the pinion 36. In the form shown in Figure 8 the rack bar or plunger 67 meshes directly with a pinion 69 on the portion 21 and the respective gear ratios are calculated to only revolve the hanger 65 for about three fourths of a complete revolution of the rotor. This I described simply as an illustration and will state that in any instance where this feature is employed I need only observe the position of the diaphragm 64 with reference to the movable clutch device so as to prevent interference between such parts when the hanger is revolved. The dual capacity of the striking surface 63 is quite a factor in that I eliminate certain extra clutch surfaces as provided for hereinbefore.

While I have herein fully shown and described, and have pointed out in the appended claims certain novel features of construction, arrangement, and operation which characterize my invention, it will be understood by those skilled in the art that various omissions, substitutions, and changes in the form, proportions, sizes, and details of the device, of the materials used, and of their operation, may be made without departing from my invention.

What I claim as new is:

1. A device of the class described comprising a diaphragm, a rotor co-acting with the diaphragm to vibrate the same and provided with radial teeth at its periphery constituting the striking surface, a rotary driven device co-acting with said toothed surface between fixed points in the circumference of the rotor, and means for driving said device.

2. A device of the class described comprising a diaphragm, a rotor co-acting with the diaphragm to vibrate the same and provided with radial teeth at its periphery constituting the striking surface, a rotary driven device co-acting with said toothed surface between fixed points in the circumference of the rotor, and means for driving said device, said device including a movable portion in yielding engagement with said toothed surface.

Signed at Brooklyn, in the county of Kings and State of New York, this 20th day of May, A. D. 1919.

GERARD R. MARSICO.